Figure 1:
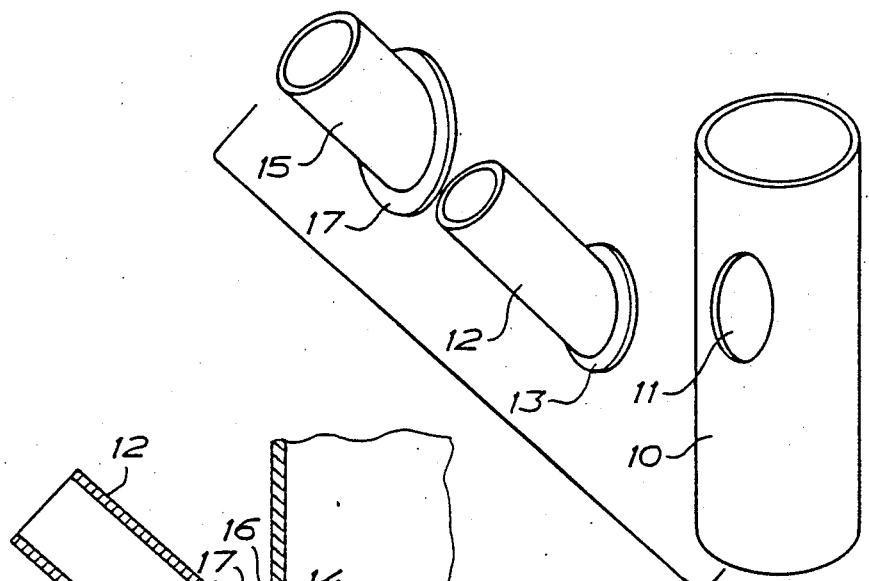

United States Patent [19]

Skönvall

[11] Patent Number: 4,903,388
[45] Date of Patent: Feb. 27, 1990

[54] METHOD OF BRANCHING OFF A TUBE

[76] Inventor: Tage Skönvall, Ekudden, Hökerum S-520 15, Sweden

[21] Appl. No.: 363,301

[22] Filed: Jun. 7, 1989

Related U.S. Application Data

[63] Continuation of Ser. No. 282,220, filed as PCT SE87/00265 on Sep. 29, 1987, published as WO87/07353 on Dec. 3, 1987, abandoned.

[30] Foreign Application Priority Data

May 30, 1986 [SE] Sweden ............................. 8602456

[51] Int. Cl.$^4$ ............................................. B21P 53/00
[52] U.S. Cl. .................................. 29/890.11; 29/401.1; 29/890.14
[58] Field of Search .......... 29/157 T, 157 R, 157.4 R, 29/401.1, 428; 285/158, 162, 192, 197, DIG. 921

[56] References Cited

U.S. PATENT DOCUMENTS

| | | | |
|---|---|---|---|
| 1,933,710 | 11/1933 | Cornell, Jr. ........................ | 29/157 R |
| 2,040,628 | 5/1936 | Recker .............................. | 29/157 R |
| 3,064,707 | 11/1962 | Walts ................................. | 29/157 T |
| 3,490,791 | 1/1970 | Mitchell ............................. | 285/162 |
| 3,934,904 | 1/1976 | Hord ................................... | 285/158 |
| 4,468,535 | 8/1984 | Law .................................... | 285/162 |
| 4,637,638 | 1/1987 | Rush et al. ......................... | 285/158 |
| 4,654,942 | 4/1987 | Rush et al. ......................... | 29/157 T |

Primary Examiner—P. W. Echols
Assistant Examiner—Irene Cuda
Attorney, Agent, or Firm—Merchant, Gould, Smith, Edell, Welter & Schmidt

[57] ABSTRACT

Method in branching off a tube (10) wherein an oval aperture (11) is made in the tube wall and a tube element (12) having a flange (13) at one end thereof, is inserted through the oval aperture from the outside of the tube. The flange is pressed against the inside surface of the tube by means of a ring (15) provided on the tube element, which is engaged with the outside surface of the tube and is fixedly secured to the tube element, a sealing ring being located between said flange on the tube element and the inside surface of the tube.

1 Claim, 1 Drawing Sheet

U.S. Patent  Feb. 27, 1990  4,903,388

METHOD OF BRANCHING OFF A TUBE

This is a continuation, of application Ser. No. 07/282,220, filed as PCT SE87/00265 on Sep. 29, 1987, published as WO87/07353 on Dec. 3, 1987, now abandoned.

The present invention relates to a method in branching off a tube wherein an oval aperture is made in the tube wall and a tube element is inserted into the aperture from the outside and is secured to the tube.

Concrete tubes are branched off in this way by using an insert socket comprising an injection moulded tube element of PVC which forms an outside abutment collar and is "sanded" on the outside surface thereof. When an aperture has been made in the concrete tube, the insert socket is inserted from the outside into the aperture until the abutment collar engages the outside surface of the concrete tube, the insert socket then being fixedly positioned by a heavy concrete bead being moulded around the insert socket.

The method cannot be applied to smooth PVC tubes. In that case there is used instead saddle branch tubes (which are used also in connection with concrete tubes). The saddle branch tube forms a substantially semi-cylindrical flange which is engaged with the outside surface of the main tube over the aperture made therein, the saddle branch tube at a guiding edge being inserted from the outside into the aperture to seal against the outside surface of the main tube by means of a sealing ring surrounding the aperture. Then, the saddle branch tube is fixedly positioned on the main tube and this can be effected by gluing the flange to the main tube. It can also be effected by clamping the flange to the main tube either by means of two straps around the main tube and the flange or by applying a complementary semi-cylindrical element to the outside of the main tube, located on the side opposite to the saddle branch tube and engaging by wedge action the flange thereof, said element being knocked into position while being axially displaced until the saddle branch tube is tight on the main tube.

The prior art methods are relatively inconvenient, because several operational steps are required wherein expensive tube elements and other elements are used. Moreover, it may be difficult to obtain the necessary sealing at the branching-off. However, above all the prior art methods cannot be applied to corrugated double-wall tubes now commonly used. In that case it is necessary to join to the main tube prefabricated tube elements by using a slide socket. This method is not only expensive but also very unsuitable in case a main tube forming part of a surface or waste water conduit, is to be branched off when in use, because contaminated water and waste and/or faeces entrained therein will flow into the trench when the aperture is being made, which is very inconvenient for people working in the trench. Another method as far as corrugated double-wall tubes are concerned comprises insertion of prefabricated branch tube elements through apertures in the main tube, said elements being provided with a sealing ring on the edge thereof. This method is commonly used in connection with well tubes. Said latter method involves the risk of the sealing ring being dislocated or ineffective due to displacement of the branch tube element under the influence of ground movements.

The purpose of the invention is to provide a method in branching off a tube which can be universally used for tubes of any type, smooth as well as corrugated, and which makes possible to provide a permanently leakproof branching-off by simple operations and by using uncomplicated tube elements and other elements. Moreover, this method can also be applied without inconvenience to a tube conduit when in use, which is not the least important aspect in this connection.

Said purpose is achieved by the method of the type referred to above wherein the tube element is inserted at a flange at one end thereof through the oval aperture and is pressed against the inside surface of the main tube by means of a ring provided on the tube element, which is engaged with the outside surface of the main tube and is secured to the tube element, a sealing ring being provided between the flange and the inside surface of the main tube. It is important that the branching-off is sealed on the inside surface of the main tube where sealing always can be effected against a smooth surface also in case of corrugated double-wall tubes.

Figure 2:
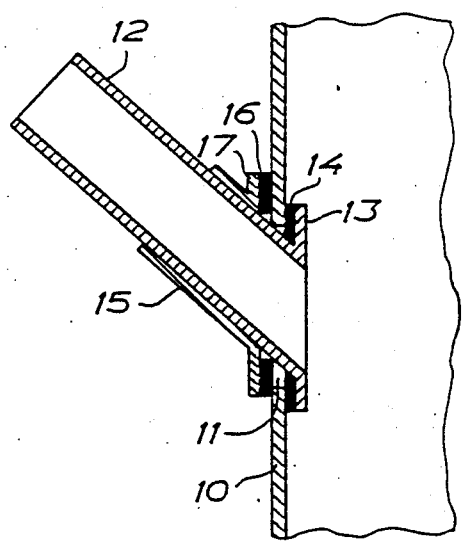
Figure 3:
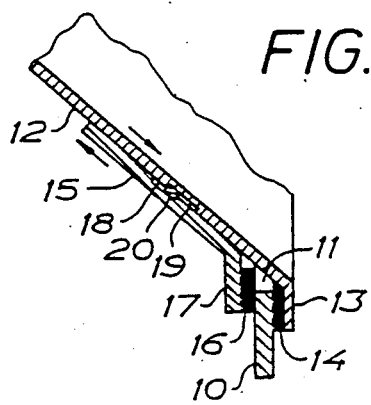
Figure 4:
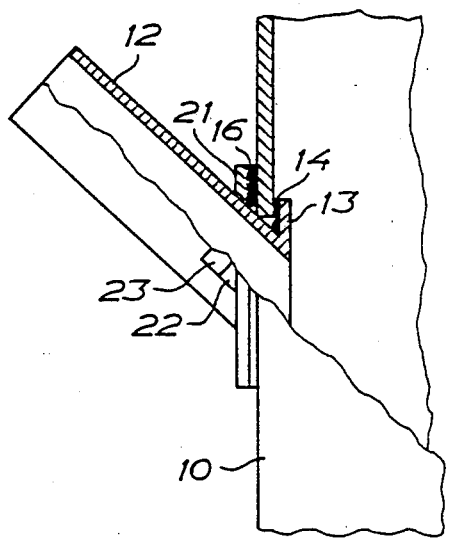

An abutment of the invention will be described with reference to the accompanying drawing wherein FIG. 1 is an exploded perspective view of the main tube and the additional elements forming part of the branching-off, FIG. 2 is a fragmentary axial sectional view of the branching-off, FIG. 3 is a fragmentary axial sectional view illustrating one method of lockingly engaging the tube element and a locking sleeve provided on said element, and FIG. 4 is a fragmentary side view, partly a cross-sectional view, showing a modified embodiment of the locking mechanism.

In the wall of a conventional tube 10, such as a plastic tube, there is made at the location where said tube is to be branched off, an oval aperture 11 which is initially marked by using a suitable templet. Then, the aperture is made by using a piercing saw. The tube element to be connected with the tube 10 to form the branch tube thereof is designated 12, and for working the method of the invention this tube element forms a flange 13 at one end thereof. The shape and size of the aperture 11 have to be designed geometrically in relation to the diameter of the tube 10 and the diameter of the tube element 12, but said aperture must be sufficiently large to allow the flange 13 to be inserted through the aperture from the outside of the tube 10 and to be engaged with the inside surface of the tube along the entire circumference of the aperture. If the tube element 12 is made of plastic material such as PVC, as is usually the case, it has some inherent elasticity so that it can be compressed transversely, and in that case it has been found that the shape and size of the aperture can be substantially in agreement with the shape and size of the insert end opening of the tube element, said opening being positioned in a plane inclined to the axis of said element at an angle corresponding to the branching-off angle. Thus, even if the flange 13 projecting from the edge of said end opening of the tube element, has an outer dimension which is larger than the aperture 11, it can be manipulated through the aperture without difficulties, possibly by compressing the tube element transversely, so as to be brought into said position engaging the inside surface of the tube 10. However, before the tube element is inserted a sealing ring 14 should be passed onto said tube element against the flange 13 so as to seal between the flange and the inside surface of the tube as shown in FIG. 2. This sealing ring can be a flat sealing ring as shown or an O ring located in a channel or groove in the flange 13. The sealing ring should be rather thin, which is true also as far as the flange is concerned so as to minimize disturbance of the flow through the tube 10 by inwardly projecting portions of the branching-off.

In order to lock the tube element 12 in the intended position thereof an annular sleeve 15 is passed onto the tube element 12 and is tightly pressed against the outside surface of the tube 10. Possibly, an elastic ring 16 may be passed onto the tube element so as to be located between the outside surface of the tube and a flange 17 at one end of the sleeve 15 as shown in FIG. 2. When the flange 17 is pressed against the outside surface of the tube, the elastic ring 16 will be compressed. The purpose of said ring primarily is not to seal although it can fulfil this function on a tube 10 having a smooth outside surface, but to provide a spring action between the flange 17 and the outside surface of the tube 10 in order to maintain automatically the seal between the flange 13 and the inside surface of the tube 10 by adjustment of the flange 13 under the spring bias of the ring 16 when the sealing ring 14 ages.

In order to position fixedly the sleeve 15 on the tube element 12 in the intended position thereof pressed against the tube 10, several arrangements may be used. E.g. in the inside surface of the sleeve 15 and the outside surface of the tube element 12, grooves may be provided which register in the intended position of the sleeve 15, a strap member being slid through a tangential opening into the annular passage formed by the grooves to lock the sleeve 15 and the tube element 12 to each other in the axial direction thereof. In order to allow adjustment several grooves may be provided, the grooves in the sleeve having another spacing than the grooves in the tube element such that different grooves register in dependence on the relative displaced position of the sleeve and the tube element.

FIG. 3 discloses a further embodiment wherein a groove 18 is provided in the sleeve 15 and a groove 19 is provided in the tube element 12, a strap member 20 being slid into the grooves to lock the sleeve and the tube element, respectively, against relative displacement in the directions indicated by arrows. The pressure then can be adjusted by sliding strap members of different widths into the grooves.

The tube element can be corrugated on the outside thereof and in that case the strap member 20 can have T-shaped cross section to engage into the groove 18 in the sleeve 15 and in a proper groove in the corrugated tube element.

FIG. 4 discloses a still further embodiment of the locking mechanism, wherein the sleeve 15 is dispensed with and a ring 21 only, corresponding to flange 17 formed by the sleeve 15, is provided. The tube element 12 has two or more shoulder portions 22 which are chamfered at the end thereof facing away from the insert end of the tube element as shown at 23, so that the ring 21 can be displaced along the tube element 12 and passed over the shoulder portions to engage by snap action behind the shoulder portions in a position wherein the ring presses tightly the elastic ring 16 against the outside surface of the tube 10. It is also possible to arrange the ring 21 as a clamp ring which is tightened around the tube element 12, no shoulder portions being provided in that case.

It should be mentioned that the method of the invention can be applied also to tubes having a relining of polyethylene. Such relining has a tendency to fold into the tube when the aperture 11 is made, which is of no importance, however, when the tube is branched off as described above.

I claim:

1. Method in branching off a tube wherein an oval aperture is made in the tube wall and a tube element is inserted into the aperture from the outside and is secured to the tube, characterized in that the tube element is inserted at a flange at one end thereof through the oval aperture and is pressed against the inside surface of the main tube by means of a ring passed over the tube element, which is engaged with the outside surface of the main tube and is secured by snap action in the engaged position by being pressed over retaining shoulder portions on the tube element, a sealing ring being provided between the flange and the inside surface of the main tube.

* * * * *